United States Patent [19]

Marshall et al.

[11] Patent Number: 5,666,545
[45] Date of Patent: Sep. 9, 1997

[54] DIRECT ACCESS VIDEO BUS COMPUTER SYSTEM AND METHOD FOR TRANSFERRING VIDEO INFORMATION USING A DEDICATED VIDEO BUS

[75] Inventors: Jay A. Marshall, Taylors; Thomas F. Heil, Easley; Donald H. Parsons, Jr., Liberty, all of S.C.

[73] Assignee: NCR Corporation, Dayton, Ohio

[21] Appl. No.: 240,953

[22] Filed: May 11, 1994

Related U.S. Application Data

[63] Continuation of Ser. No. 761,586, Sep. 18, 1991.

[51] Int. Cl.⁶ .............................................. G06F 13/38
[52] U.S. Cl. .................... 395/304; 395/827; 395/380; 395/183.19; 395/677; 364/DIG. 1; 364/281.7
[58] Field of Search ................................ 395/800, 275; 364/DIG. 1, 521; 370/85

[56] References Cited

U.S. PATENT DOCUMENTS

| 4,513,390 | 4/1985 | Walter et al. ............... | 364/900 |
|---|---|---|---|
| 4,564,915 | 1/1986 | Evans et al. ............... | 364/521 |
| 4,597,016 | 6/1986 | Nakamura et al. ............ | 358/261 |
| 4,604,743 | 8/1986 | Alexandru ................... | 370/85 |
| 4,631,598 | 12/1986 | Burkhardt et al. .......... | 358/280 |
| 4,815,033 | 3/1989 | Harris ...................... | 364/900 |
| 4,835,712 | 5/1989 | Drebin et al. ............... | 395/123 |
| 4,862,154 | 8/1989 | Gonzalez-Lopez .............. | 345/201 |
| 4,914,570 | 4/1990 | Peacock ..................... | 395/650 |
| 4,952,149 | 8/1990 | Duret et al. ................ | 433/215 |
| 4,965,559 | 10/1990 | Dye ......................... | 340/717 |
| 4,967,375 | 10/1990 | Pelham et al. ............... | 395/166 |
| 4,992,961 | 2/1991 | Petersen .................... | 364/521 |
| 5,008,816 | 4/1991 | Fogg, Jr. et al. ............ | 364/DIG. 1 |
| 5,025,249 | 6/1991 | Seiler et al. ............... | 340/721 |
| 5,122,973 | 6/1992 | Venner et al. ............... | 395/117 |
| 5,245,322 | 9/1993 | Dinwiddie, Jr. et al. ....... | 345/115 |
| 5,254,983 | 10/1993 | Long et al. ................. | 345/147 |
| 5,267,334 | 11/1993 | Normille et al. ............. | 382/56 |
| 5,269,005 | 12/1993 | Heil et al. ................. | 395/275 |

FOREIGN PATENT DOCUMENTS

| 0188828 | 7/1986 | European Pat. Off. . |
|---|---|---|
| 0263799 | 4/1988 | European Pat. Off. . |
| 9115910 | 10/1991 | WIPO . |

OTHER PUBLICATIONS

Borden et al., "Graphics Processing on a Graphics Supercomputer", IEEE Computer Graphics and Applications Magazine, 07/89, pp. 56–62.

*Primary Examiner*—Alyssa H. Bowler
*Assistant Examiner*—Walter D. Davis
*Attorney, Agent, or Firm*—Gregory P. Gadson

[57] ABSTRACT

In a computer system, a direct access, independently arbitrated video bus (connected to a personal computer (PC) -compatible video subsystem) is directly coupled to one or more dual-ported processors to eliminate video cycle traffic over the system bus or buses and I/O bus, thereby improving system performance. The preferred embodiment architecture has, in addition to the video bus, multiple processors coupled to at least two independently arbitrated system buses which are coupled to at least two independently arbitrated input/output (I/O) buses, to provide for rapid bus information signal transfer rates.

5 Claims, 6 Drawing Sheets

DIRECT ACCESS VIDEO BUS COMPUTER SYSTEM AND METHOD FOR TRANSFERRING VIDEO INFORMATION USING A DEDICATED VIDEO BUS

This is a continuation of copending application Ser. No. 07/761,586 filed on Sep. 18, 1991.

FIELD OF THE INVENTION

The present invention generally relates to computer systems, and more particularly to information transfer between computer system processors and computer video subsystems.

BACKGROUND OF THE INVENTION

Video operations include the operations necessary to control video displays to visually communicate computer processes to a user. Typical video operations are performed by a video subsystem under the control of one or more system processors. For example, during video cycles, a processor might transfer display instructions and display data, to be interpreted and ultimately displayed by the video subsystem.

Prior art computer system architecture requires that a system processor refrain from performing other tasks while a video cycle is being performed since the video cycles and other cycles must be performed over the same bus or buses. This results in undesirable system bus bottlenecks during the transfer of video cycles, which can significantly reduce system performance.

What is desired but unavailable in the prior art, is an inexpensive and efficient modification of existing computer systems in which the processor or processors are free to perform other cycles concurrently (i.e., in parallel or simultaneously) with video cycles, and video cycle traffic on system buses is minimized.

SUMMARY OF THE INVENTION

In view of the above, it is a first object of the present invention to provide a computer system with increased video cycle transfer speed between a processor and a video subsystem.

It is a second object of the present invention to provide a computer system which satisfies the first object in an inexpensive manner.

It is a third object of the present invention to provide a computer system with decreased system bus video cycle traffic.

It is a fourth object of the present invention to provide a computer system which allows video cycle transfers to run in parallel with other types of cycles.

It is a fifth object of the present invention to provide a multiple processor computer system which satisfies the above objects.

It is a sixth object of the present invention to provide a multiple system bus computer system which satisfies the above objects.

It is a seventh object of the present invention to provide a computer system meeting the above objects which significantly reduces arbitration by processors for system buses and input/output buses for video cycle transfers.

It is an eighth object of the present invention to provide a computer system meeting the above objects which also has one or more input/output buses.

There is provided in accordance with the present invention, a computer system which includes:

at least one system bus;

at least a video bus for handling video cycle information; and at least one processor having a plurality of ports, the processor connected via a first port to a system bus and via a second port to the video bus.

There is also provided in accordance with the present invention, a computer system cycle performance method in a computer system at least having one or more processors, and one or more system buses, the method at least including the steps of:

establishing at least a separate video bus for handling video cycle information;

establishing a plurality of ports on the processor;

connecting each processor via a first port to at least one system bus;

connecting each processor via a second port to the video bus; and performing a video cycle via the second port over the video bus while concurrently performing another cycle via the first port over a system bus.

The details of the present invention will be revealed in the following description with reference to the attached drawings.

DESCRIPTION OF THE PREFERRED EMBODIMENT

Since the invention resides primarily in the novel structure combination and the method of operation of well-known computer circuits and devices, and not in the specific detailed structure thereof, the structure, control, and arrangement of these well-known circuits and devices are illustrated in the drawings by use of readily understandable block representations and schematic diagrams, which show only the specific details pertinent to the present invention. This is done in order not to obscure the disclosure with structural details which will be readily apparent to those skilled in the art in view of the description herein. Also, various portions of these systems have been appropriately consolidated and simplified to stress those portions pertinent to the present invention.

Figure 1A:
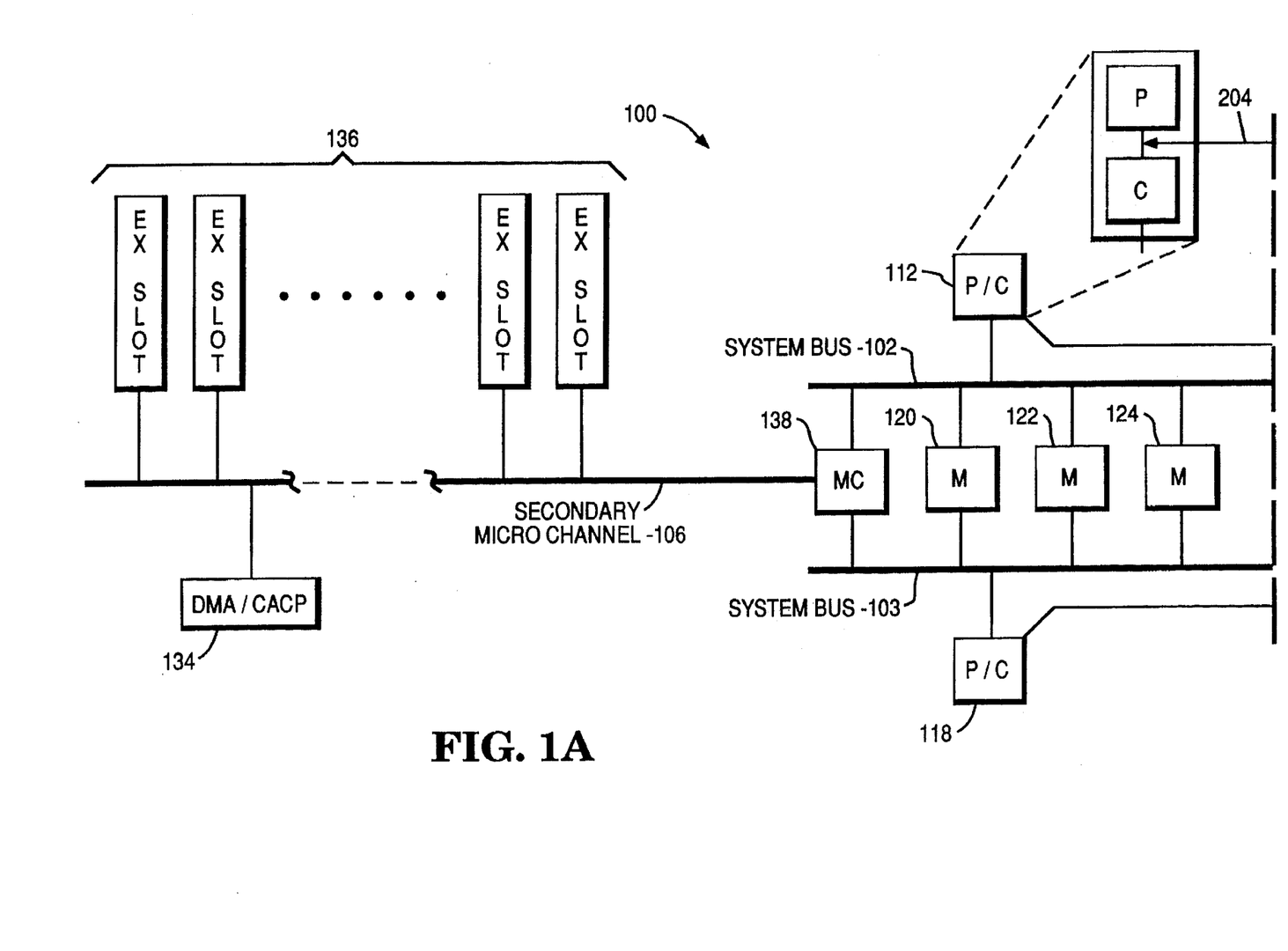
FIGS. 1A and 1B, when matchedly joined at their vertical bold, dashed lines, form a generalized schematic block diagram of the preferred embodiment of a computer system architecture incorporating the present invention.
Figure 1B:
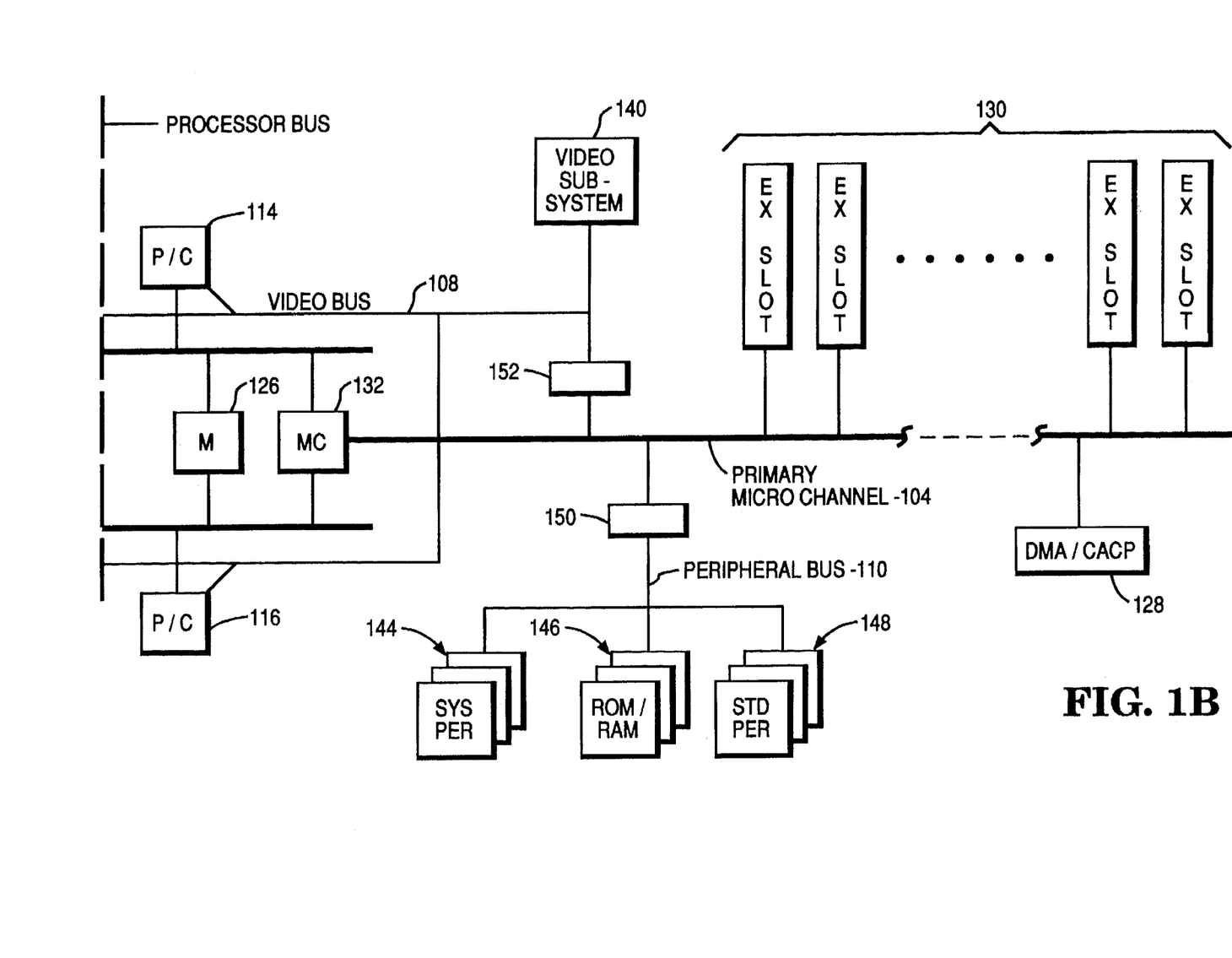

The computer system 100 in FIGS. 1A and 1B incorporates the aforementioned improvement over the prior art.

The system 100 contains two system buses 102 and 103 for transferring information in the form of control, address and data signals, as is known in the art. A primary input/output (I/O) bus 104 and a secondary I/O bus 106 are connected to the system buses 102 and 103 via I/O bus interface circuits 132 and 138, respectively. The I/O buses 104 and 106 are personal computer (PC) compatible Micro Channel™ buses. Micro Channel is a registered trademark of the International Business Machines Corporation. The I/O buses 104 and 106 support several peripheral devices and agents, which selectively connect and disconnect to the system 100.

Two processing units (P/C) 112 and 114 are ported to the system bus 102, while two other processing units (P/C) 116 and 118 are ported to the system bus 103. The processing units each contain a central processing unit (CPU) or processor (P) and a high-speed cache memory (C), as is known in the art.

A peripheral bus 110 connects additional peripheral devices to the system 100 as needed to the primary I/O bus 104. The additional peripheral devices connected by the peripheral bus 110 in the preferred embodiment are: several read only memory/random access memories (ROM/RAMs) 146, various standard peripherals (STD PER) 148, and various system specific peripherals (SYS PER) 144. The peripheral bus 110 is buffered via a discrete buffer logic unit 150.

Combination direct memory access/central arbitration control point units (DMA/CACP) 128 and 134 are connected to I/O buses 104 and 106, respectively to control direct memory access operations. That is, operations involving memory and agents in the system 100 without intervention by a processing unit. Also connected to the I/O buses 104 and 106 are several expansion slots (EX SLOT) 130 and 136, respectively, to provide the system 100 with an expansion and upgrade feature when the user desires to add additional agents to the system 100.

A video bus 108 links the system 100 to video subsystem 140, which includes means for interpreting video information signals from the processing units 112–118 and for driving video display hardware, in a manner well-known in the art. A video bus controller/arbitration unit (not shown) in the video subsystem 140 arbitrates the video bus 108 between processing units and between agents on the I/O bus 104. Buffer logic 152 isolates the video bus 108 from the I/O bus 104. The I/O agents on the I/O bus 104 include the I/O bus interface circuit 132, the DMA controller 128, and adapters on one or more expansion slots 130. The I/O bus interface circuit 132 runs video cycles on behalf of processing units when the video bus 108 is disabled, as described, infra.

In contrast to prior art computer system architecture, each of the processing units 112–118 is dual ported, with one port connected to one of the system buses 102 or 103, and the other port directly connected to the video bus 108. This provides for direct access by the processing units 112–118 to the video subsystem 140. The video bus 108 is independently arbitrated so that a processing unit 112–118 need not separately arbitrate for the system buses and the I/O buses in order to perform a video cycle. In addition, because of the dual porting, the processing units need not wait until a video cycle is complete before beginning other operations via the system buses.

Figure 2:
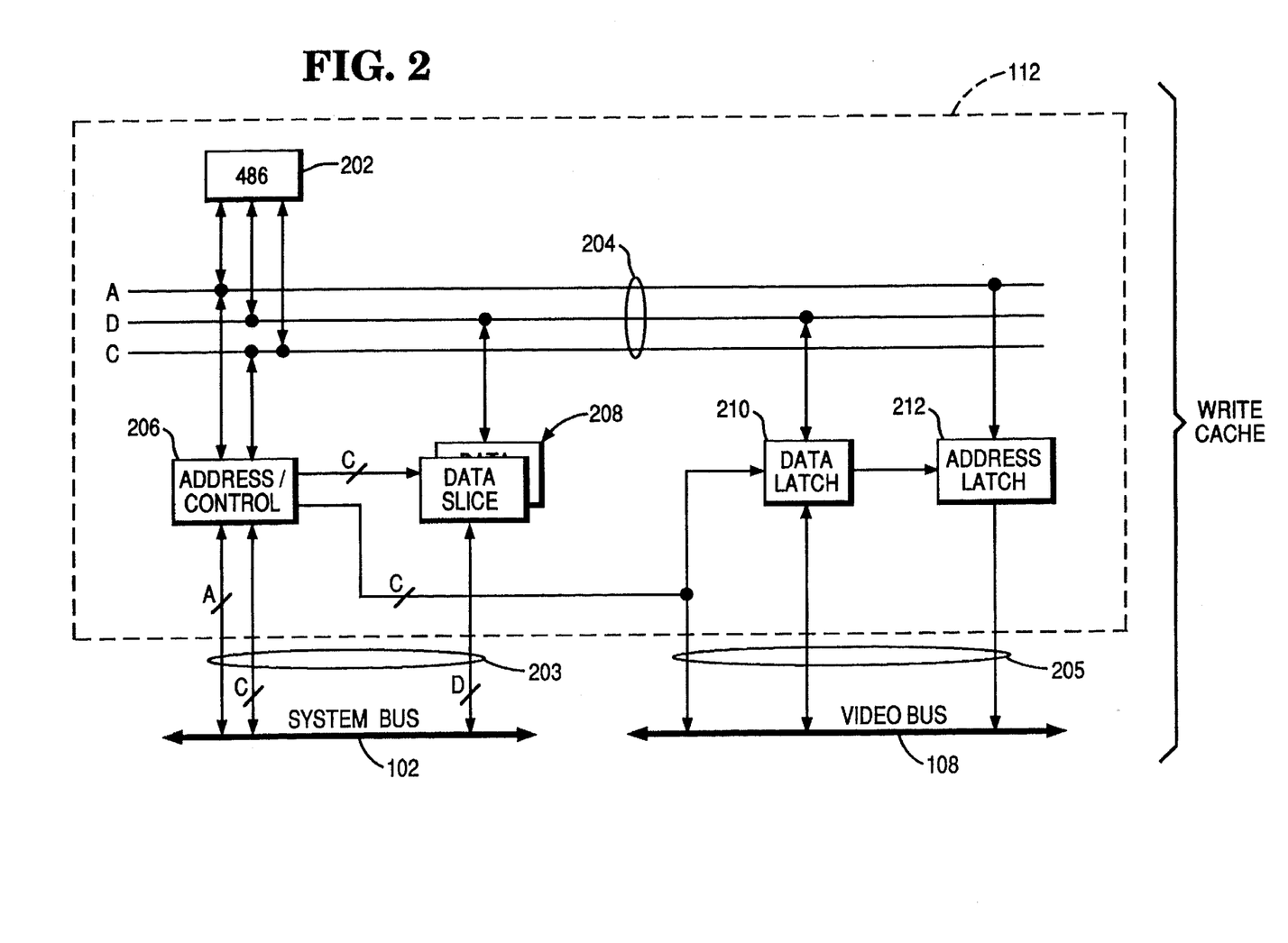
FIG. 2 is a schematic block diagram of an application specific integrated circuit (ASIC) for a write processor cache of the computer system in FIGS. 1A and 1B.

FIG. 2 shows a schematic diagram of a processing unit 112 (or 114, 116, 118) connected by its two ports 203 and 205 to the system bus 102 and the video bus 108. The processor 202 in the preferred embodiment is a Model 486 of the Intel Corporation. The elements 206 and 208 form a write cache system bus interface unit implemented in several ASICs. The write cache system bus interface ASICs handle all of the cache operations of their associated processing units. Elements 210 and 212 are discrete logic buffers which buffer and latch data and address signals to/from the video bus 108. Also, the element 206 performs all of the address decode and control functions for both the system bus and video bus ports 203 and 205, respectively.

A processor bus 204 connects the processor 202 to the system bus 102 via a port formed by the input/output lines of an address/control unit 206 and a data slice unit 208. The address/control unit 206 serves as an intermediate storage device for address and control signals received from the processor 202. The address signals are received from the processor bus 204 via the processor bus line "A", while the control signals are received from the processor bus 204 via the processor bus line "C". Data signals are received from the processor bus 204 via the processor bus line "D".

The second port 205 of the processing unit 112 directly connects the processing unit 112 to the video bus 108. A data latch 210 and an address latch 212 serve to latch data and address signals received from the processor 202 via the processor bus 204.

The general operation of the computer system 100 with respect to video cycle transfers is as follows. A processing unit 112–118 desiring to make a video cycle transfer must have control of the video bus 108. Only one device can have control of the video bus 108 at a time. The requesting processing unit 112–118 generates a request for control of the video bus 108 via its port 205. (I/O bus agents can also access the video bus 108, and these requests are given priority over processing unit requests.) The video bus controller/arbitration unit (not shown) in the video subsystem 140 informs the current owner of the video bus 108 that another device is requesting ownership. When the current owner of the video bus 108 completes its video transfer, it relinquishes control of the video bus 108.

The video bus controller then passes control of the video bus 108 to the requesting processing unit, which then becomes "parked" (the exclusive owner). A processing unit remains parked while it is making video cycle transfers, and indefinitely afterwards, until another device requests control of the video bus 108. The devices requesting ownership of the video bus 108 can be either a processing unit, the I/O bus interface circuit 132, the DMA controller 128, or one or more adapters on the expansion slots 130.

A parked processing unit need not arbitrate for the video bus 108, but can begin transferring a video cycle as soon as the cycle is decoded by the address decode element 206. This provides a further system advantage because typical video processes are managed by one processor at a time. Thus, the current parked processing unit is likely to be the processing unit which will need to transfer the next video cycle, resulting in still less arbitration for the video bus 108.

Recall that video data and address signals are latched in the latches 210 and 212, respectively. Once the data and address signals are transferred to the video subsystem 140 via the video bus 108, the video bus control logic in element 206 issues an end-of-transfer signal to the processor 202, so that the parked processor can begin concurrently executing other (non-video) cycles over the system bus 102. For example, the processor can perform a memory cycle over the system bus involving memory interleaves 120–126, while the video subsystem 140 is executing the video cycle.

Unlike video write cycles, when a processing unit performs a video read cycle, it must wait until the cycle is complete (valid data transferred from the video subsystem 140) before the processing unit can perform other cycles over the system buses. While performing video read cycles results in a time penalty compared to the performance of video write cycles, the system may still operate faster than many prior art systems. This is because a processing unit other than the one parked on the video bus 108 (and performing a video read cycle), can concurrently gain control of a system bus and perform other cycles (while the video cycle is being performed). Also, the I/O bus interface circuits 132 and 138 can gain access to I/O devices and the system memory while a video read cycle is being performed.

Figure 3:
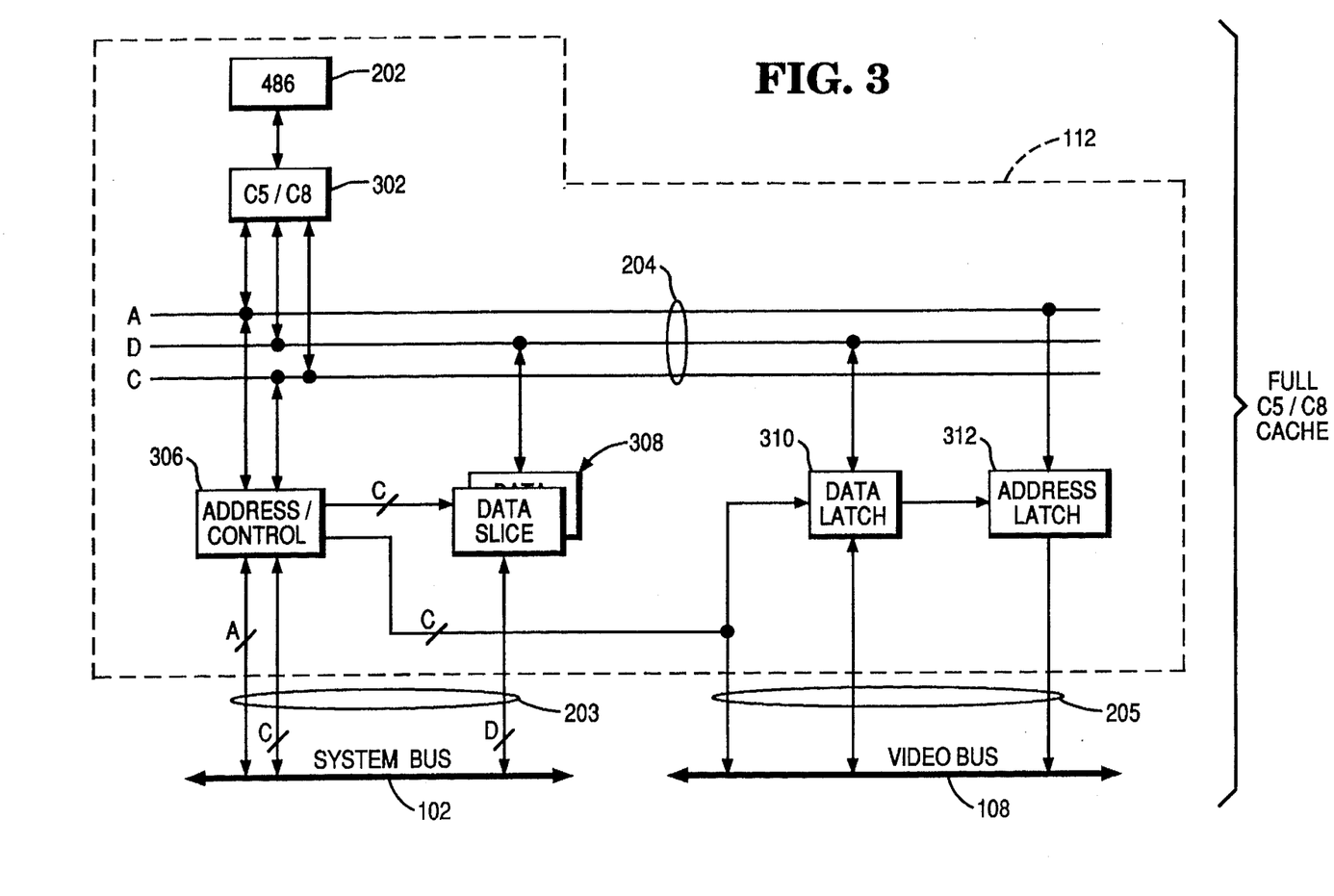
FIG. 3 is a schematic block diagram of an ASIC for a read or write processor cache of the computer system in FIGS. 1A and 1B.

An example of a processing unit card that implements a full read/write cache instead of a write cache only, is depicted in FIG. 3. The video bus management principles are identical to those described for the write cache depicted in FIG. 2. As far as video bus operations are concerned, elements 306, 308, 310 and 312 function similarly to elements 206, 208, 210 and 212, respectively. The primary difference between FIG. 3 and FIG. 2 is the cache implementation, which does not affect the video bus operation. Specifically, the read/write cache processor unit depicted in FIG. 3 uses a C5/C8 cache subsystem supplied by Intel Corporation.

The video bus 108 is software-enabled by storing the proper commands in system control registers (not shown). A disabled bus results in a default to the system and I/O buses for video cycle traffic; e.g., processing unit 112 would propagate the cycle over the system bus 102, the I/O bus 104, and through element 152 to get to the video bus 108.

The various processing units are enabled for video cycle transfer operations via system configuration registers in manners well-known in the art. One advantage of being able to disable the video bus 108 is that it can be disabled if an I/O device is found to be incompatible with the video bus.

Figure 4:
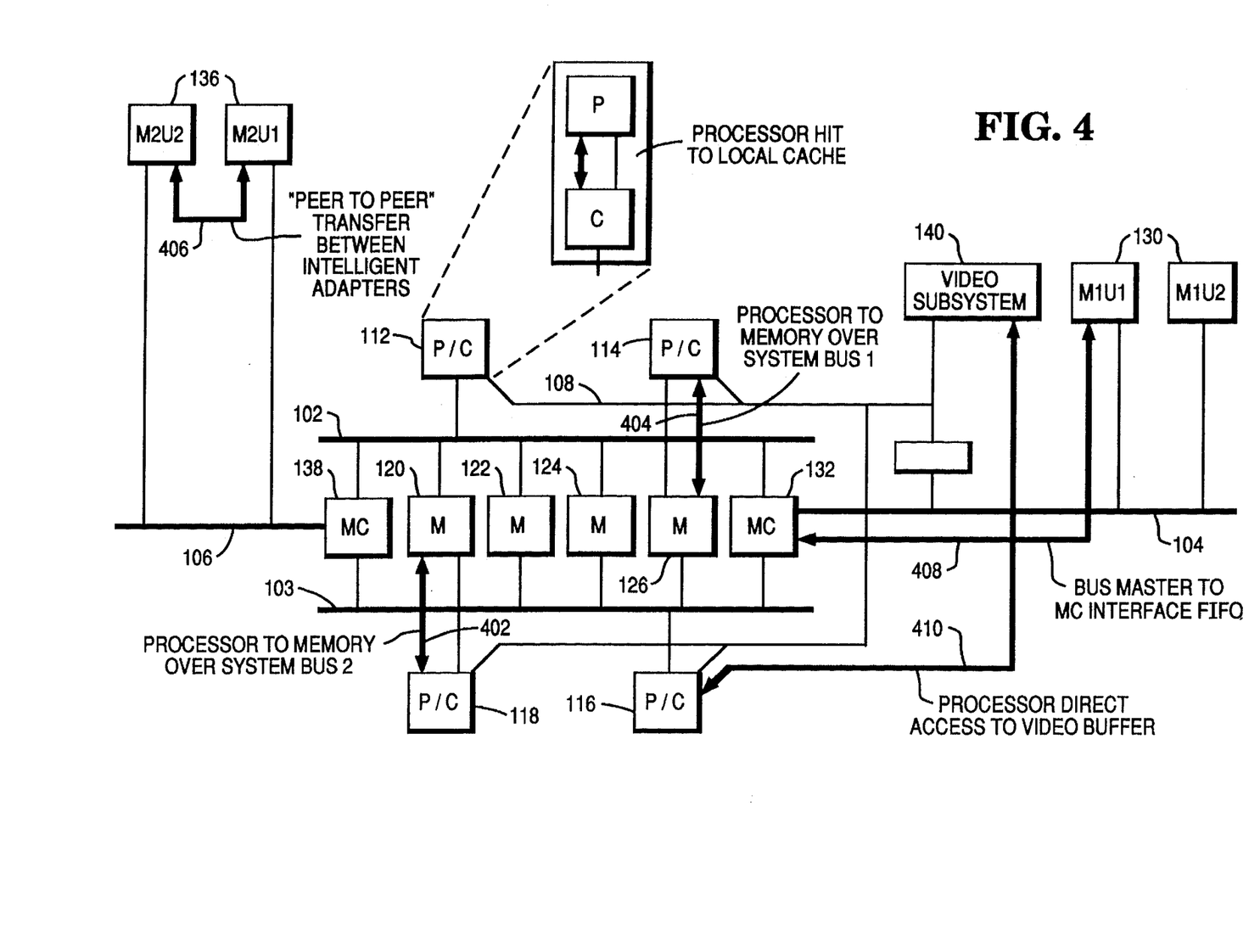
FIG. 4 is a schematic block diagram of multi-tasking by a processor in a multi-processor system running parallel operations over the video bus and a system bus.

The block diagram of FIG. 4 illustrates how the bus structure of the disclosed architecture facilitates operations within the multiple processor system 100 by means of the many possible concurrent operations which can be performed. For example, the processing unit 118 is coupled to the memory interleave 120 via the system bus 103 through a path 402 while the processor 114 is coupled to the memory interleave 126 via the system bus 102 through a path 404.

In addition, the following system operations occur concurrently with the operations of the processing units 118 and 114: two I/O bus agents M2U1 and M2U2 are coupled to one another via the I/O bus 106 through a path 406; a bus agent M1U1 is coupled to the the I/O bus interface circuit 132 via the I/O bus 104 through a path 408, awaiting availability of one of the system buses 102, 103 for a memory operation, for example; and, the processing unit 116 is coupled to the video subsystem 140 via the video bus 108 through a path 410. The paths 402-410 are merely representative of the numerous concurrent paths through the multiple processor system 100. It should be apparent to those skilled in the art that the bus structure along with the use of memory interleaves and cache memories minimizes use of the system bus and memory of systems configured in accordance with the disclosure and teachings of the present invention, in addition to enabling concurrent operation of the system processors and agents resident on the I/O buses.

Figure 5:
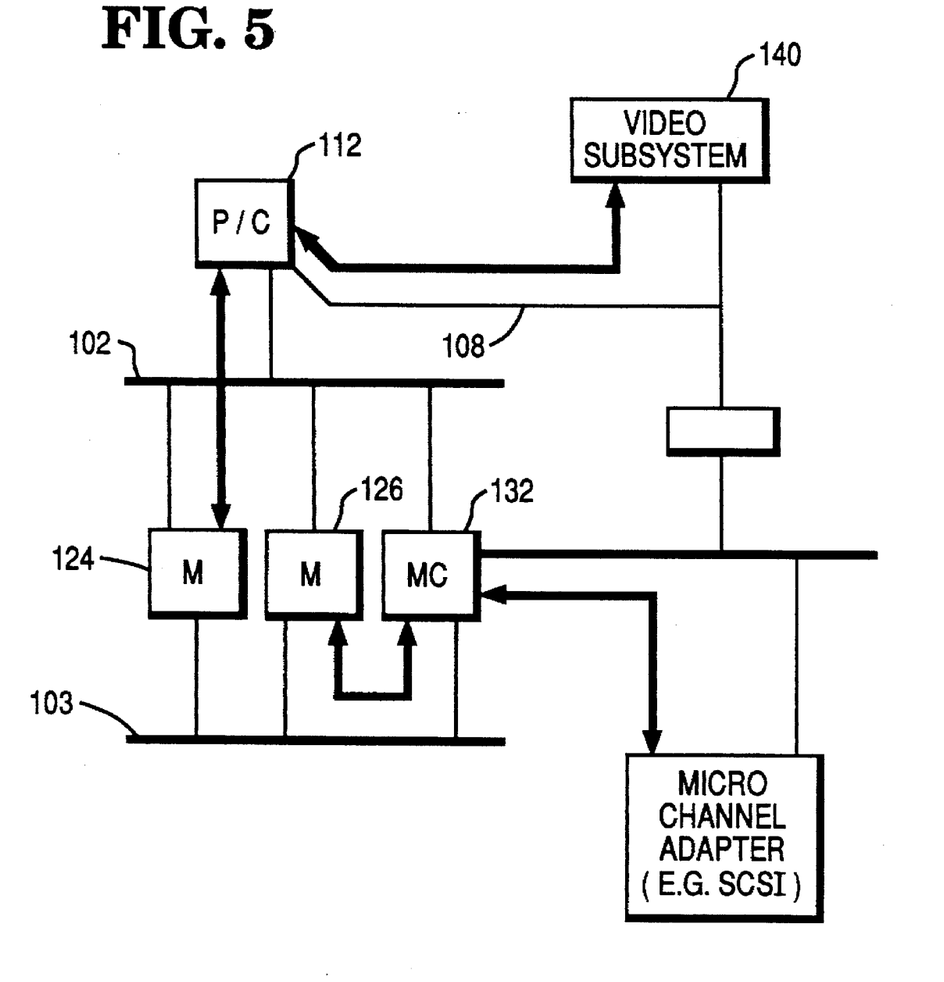
FIG. 5 is a schematic block diagram of multi-tasking by a processor in a uni-processor system running parallel operations over the video bus and a system bus.

Even in the uni-processor case depicted in FIG. 5, many possible concurrent paths exist.

Variations and modifications to the present invention are possible given the above disclosure. However, such variations and modifications are intended to be within the scope of the invention claimed by this letters patent. For example, the present invention need not be limited to multiple processor systems, but can work with uni-processor systems. Also, the present invention need not be limited to multiple system bus systems, but can work with single system bus systems, as well.

We claim:

1. A computer system, comprising:

a system bus;

a video bus which handles video cycle information;

a video subsystem coupled to said video bus;

a processor having a first port and a second port, said processor coupled via the first port to said video bus and via the second port to said system bus;

means for causing said processor to perform a first video cycle via the first port over said video bus so as to cause data to be transferred between said processor and said video subsystem over said video bus in accordance with the first video cycle while concurrently performing a memory cycle via the second port over said system bus so as to cause data to be transferred over said system bus in accordance with the memory cycle;

means for disabling said video bus; and means for causing said processor to perform a second video cycle via the second port over said system bus if said video bus is disabled.

2. A computer system, comprising:

a system bus;

a memory coupled to said system bus;

a video bus;

a video subsystem coupled to said video bus;

a processor having a first port and a second port, said processor being coupled to said video bus via the first port and to said system bus via the second port; and means for causing said processor to execute a first video cycle via the first port over said video bus so as to cause data to be transferred between said processor and said video subsystem over said video bus in accordance with the first video cycle while concurrently executing a memory cycle via the second port over said system bus so as to cause data to be transferred between said processor and said memory over said system bus in accordance with the memory cycle;

means for disabling said video bus; and means for causing said processor to execute a second video cycle via the second port over said system bus while, said video bus is disabled, so as to cause data to be transferred between said processor and said memory over said system bus in accordance with the second video cycle.

3. A computer system, comprising:

a system bus;

a memory coupled to said system bus;

a video bus;

a video subsystem coupled to said video bus;

a processor having a first port and a second port, said processor being coupled to said video bus via the first port and to said system bus via the second port; and means for causing said processor to execute a first video cycle via the first port over said video bus so as to cause data to be transferred between said processor and said video subsystem over said video bus in accordance with the first video cycle while concurrently executing a memory cycle via the second port over said system bus so as to cause data to be transferred between said processor and said memory over said system bus in accordance with the memory cycle;

an input/output bus coupled to said system bus and to said video subsystem;

means for disabling said video bus; and means for causing said processor to execute a second video cycle via the second port over said system bus and said input/output bus, while said video bus is disabled, so as to cause data to be transferred between said processor and said video subsystem over said system bus and said I/O bus in accordance with the second video cycle.

4. A method for transferring data in a computer system having a processor, a video subsystem, a memory, a video bus, and a system bus, comprising the steps of:

performing a first video cycle via a first port of the processor over the video bus so as to cause data to be transferred between the processor and the video subsystem over the video bus in accordance with the first video cycle; and performing a memory cycle via a second port of the processor over the system bus so as to cause data to be transferred between the processor and the memory over the system bus in accordance with the memory cycle, wherein the memory cycle performing step is performed during the first video cycle performing step;

disabling the video bus; and performing a second video cycle via the second port of the processor over the system bus, while the video bus is disabled, so as to cause data to be transferred between the processor and the video subsystem over the system bus in accordance with the second video cycle.

5. A method for transferring data in a computer system having a processor, a video subsystem, a memory, a video bus, and a system bus, comprising the steps of:

performing a first video cycle via a first port of the processor over the video bus so as to cause data to be transferred between the processor and the video subsystem over the video bus in accordance with the first video cycle; and performing a memory cycle via a second port of the processor over the system bus so as to cause data to be transferred between the processor and the memory over the system bus in accordance with the memory cycle, wherein the memory cycle performing step is performed during the first video cycle performing step, wherein the computer system also has an input/output bus, and further comprising the steps of:

disabling the video bus; and performing a second video cycle via the second port of the processor over the system bus and the input/output bus, while the video bus is disabled, so as to cause data to be transferred between the processor and the video subsystem over the system bus and the I/O bus in accordance with the second video cycle.

* * * * *